US008486475B2

(12) United States Patent
Villagran et al.

(10) Patent No.: US 8,486,475 B2
(45) Date of Patent: Jul. 16, 2013

(54) RICE FLOUR COMPOSITIONS

(76) Inventors: Maria Dolores-Martinez-Serna Villagran, Mason, OH (US); Marko Stojanovic, Cincinnati, OH (US); David Cammiade Gruber, Cincinnati, OH (US); David Shang-Jie Chang, Cincinnati, OH (US)

( * ) Notice: Subject to any disclaimer, the term of this patent is extended or adjusted under 35 U.S.C. 154(b) by 364 days.

(21) Appl. No.: 10/913,002

(22) Filed: Aug. 6, 2004

(65) Prior Publication Data
US 2005/0053715 A1 Mar. 10, 2005

Related U.S. Application Data

(60) Provisional application No. 60/492,922, filed on Aug. 6, 2003.

(51) Int. Cl.
*A23L 1/217* (2006.01)
(52) U.S. Cl.
USPC ............ 426/549; 426/496; 426/618; 426/808
(58) Field of Classification Search
USPC .......................................... 426/622, 560, 808
See application file for complete search history.

(56) References Cited

U.S. PATENT DOCUMENTS

| | | | |
|---|---|---|---|
| 3,626,466 A | 12/1971 | Liepa | |
| 3,840,673 A | 10/1974 | Kortschot et al. | |
| 4,634,596 A | 1/1987 | Eastman | |
| 4,769,253 A | 9/1988 | Willard | |
| 4,770,891 A | 9/1988 | Willard | |
| 4,879,126 A | 11/1989 | Willard et al. | |
| 5,051,133 A * | 9/1991 | Nagai et al. ...................... | 127/65 |
| 5,085,884 A | 2/1992 | Young | |
| 5,320,858 A | 6/1994 | Fazzolare et al. | |
| 5,405,625 A * | 4/1995 | Biggs ............................... | 426/93 |
| 5,422,131 A | 6/1995 | Elsen | |
| 5,429,834 A | 7/1995 | Addesso et al. | |
| 6,224,921 B1 | 5/2001 | Shih | |
| 6,287,622 B1 | 9/2001 | Martinez-Serna Villagran | |
| 6,352,730 B1 | 3/2002 | Zimmerman | |
| 6,432,465 B1 | 8/2002 | Martines-Serna Villagran | |
| 6,479,089 B2 * | 11/2002 | Cohen ........................... | 426/550 |
| 6,558,730 B1 | 5/2003 | Gisaw | |
| 7,189,424 B2 * | 3/2007 | Gorski ........................... | 426/560 |
| 2002/0025367 A1 | 2/2002 | Koehler et al. | |
| 2002/0160092 A1 | 10/2002 | Villagran | |
| 2006/0286271 A1 | 12/2006 | Villagran | |

FOREIGN PATENT DOCUMENTS

| | | |
|---|---|---|
| EP | 0 738 473 A2 | 10/1996 |
| JP | H110146762 | 6/1999 |
| WO | WO 96/01572 A1 | 1/1996 |
| WO | WO 99/51111 A1 | 10/1999 |

OTHER PUBLICATIONS

S. Parlin; "Rice Flour Makes its Mark"; Food Processing Soulutions; vol. 58, 1997, p. 60.
M.H. Lee, et al.; "Physicochemical Properties of Calcium-Fortified Rice"; Cereal Chemistry, Vole 72 1995, pp. 352-355.
J.A. Fondevila, "Development and Characterization of a Snack Food Product Using Broken Rice Flour", Journal of Food Science, 1988, 53 (2), pp. 488-489.
D.D. Duxbury, "Rice Chip Mixes Solve Texture Problems", Food Processing, 1993, 54 (5), p. 81.
R. S. Kadan et al.; article—"Functional Properties of Extruded Rice Flours"—JFS: Food Chemistry & Technology—4 pgs, 2003.

* cited by examiner

*Primary Examiner* — Lien Tran
(74) *Attorney, Agent, or Firm* — Dickinson Wright PLLC

(57) ABSTRACT

Rice flour compositions having a Peak Viscosity of from about 4 RVU to about 130 RVU. In one embodiment, the rice flour compositions have a Final Viscosity of from about 4 RVU to about 220 RVU. Preferably, the compositions have a WAI of from about 2.6 to about 9. In a preferred embodiment, the Peak Viscosity of the rice flour compositions is ≦about 55(WAI)-145. The compositions can be used to produce food products such as fabricated sheeted snacks, extruded products, sauces, coatings for fried foods, dog foods, dog biscuits, baby foods and breads. The preferred doughs formed from the inventive rice flour composition are sheetable and elastic, and fabricated snacks made from the doughs have the desired taste and texture characteristics. A dry blend for a preferred fabricated snack comprises from about 2% to about 100%, preferably from about 3% to about 33%, most preferably from about 4% to about 17%, of the rice flour composition.

3 Claims, No Drawings

RICE FLOUR COMPOSITIONS

CROSS REFERENCE TO RELATED APPLICATIONS

This application claims the benefit of priority to U.S. provisional application Ser. No. 60/492,922, filed Aug. 6, 2003, which is herein incorporated by reference.

FIELD OF THE INVENTION

The present invention relates to rice flour compositions and to food products comprising rice flour compositions, especially fabricated snack products comprising rice flour compositions.

BACKGROUND OF THE INVENTION

Fabricated snack products prepared from doughs comprising starch-based materials are well-known in the art. These doughs typically comprise dehydrated potato products such as dehydrated potato flakes, granules, and/or flanules. The doughs can also comprise a number of other starch-based ingredients, such as wheat, corn, rice, tapioca, barley, cassava, and potato starches, as well as flours. These other starch-based ingredients are typically included in the doughs in lesser quantities than the dehydrated potato products.

The advantages of preparing such food products from a dough rather than from sliced, whole potatoes include homogeneity or uniformity in the end food products and the ability to more closely control the separate steps involved in the preparation of the food products. Additionally, preparing fabricated snack products from dough provides the flexibility to formulate such products according to the availability of raw materials and to consumer desires for various textures and flavors.

Rice flour is a material that is available globally. Its mild flavor makes it suitable for combining with potato products to make fabricated potato snacks. Furthermore, rice flour is suitable for use in making high-intensity flavored seasoned snacks, since the rice flour's neutral flavor does not compete with that of the seasoning.

Although rice flour can be included in fabricated snack doughs, its inclusion can lead to processing and product quality issues which are not easily solved. For example, the addition of rice flour can result in elastic doughs that are difficult to cook, dry, or fry. Furthermore, the fabricated snack products resulting from these doughs can be either too hard or too soft, with a cracker-like texture and an undesirable raw taste. This is, in part, caused by the difficulty in cooking rice flour, as rice starch has one of the highest gelatinization temperatures among the starches available for use in snacks. That is, such high gelatinization temperatures prevent the starch in rice flour from being easily degraded as is necessary in processing.

Accordingly, it is an object of the present invention to provide a rice flour composition that is suitable for use in making fabricated snack products.

This and other objects of the invention will become apparent from the following disclosure.

SUMMARY OF THE INVENTION

The present invention provides rice flour compositions that are suitable for use in making fabricated snack products. The rice flour compositions, when used in fabricated snack doughs, result in cohesive doughs having the desired level of elasticity and in finished fabricated snack products having the desired organoleptic properties.

The rice flour compositions of the present invention have a Peak Viscosity ranging from about 4 RVU to about 130 RVU, and preferably ranging from about 10 RVU to about 110 RVU. In one embodiment, the rice flour compositions have a Final Viscosity of from about 4 RVU to about 220 RVU, preferably from about 60 RVU to about 110 RVU, and more preferably from about 70 RVU to about 90 RVU. In a particular embodiment, the rice flour compositions have a Water Absorption Index (WAI) ranging from about 2.6 to about 9, and preferably ranging from about 4 to about 7.

The rice flour compositions can comprise one or more types of rice flour. For example, the rice flour composition can comprise short grain rice flour, long grain rice flour, medium grain rice flour, or combinations thereof. In a preferred embodiment, the composition comprises long grain rice flour, medium grain rice flour, or combinations thereof. Furthermore, the composition can comprise rice flour that is partially or fully gelatinized, or combinations thereof. For example, the rice flour can be gelatinized, partially gelatinized, partially pre-cooked, pre-cooked, par-boiled, extruded, or combinations thereof, such processes being necessary to degrade the starch of the rice flour to the extent necessary to effect suitable processing thereof into fabricated snack chips.

In one embodiment herein, the rice flour composition has a total amylose content ranging from about 16% to about 25%. In an embodiment comprising long grain rice flour, the composition has a total amylose content ranging from about 20% to about 25%. In an embodiment comprising medium grain rice flour, the composition has a total amylose content ranging from about 16% to about 19%.

The rice flour compositions herein can be used to make a dry blend used in the manufacture of food products, such as fabricated snacks. In one embodiment, the dry blend comprises from about 2% to about 100% of a rice flour composition, preferably from about 3% to about 33% of a rice flour composition, and more preferably from about 4% to about 17% of a rice flour composition.

The rice flour composition can also be used to produce food products such as extruded products, sauces, coatings for fried foods, dog foods, dog biscuits, baby foods and breads.

DETAILED DESCRIPTION OF THE INVENTION

A. Definitions

As used herein "broken pieces of rice" refers to kernels of rice that are less than three-fourths of the whole kernel.

As used herein "gelatinized" includes any type of gelatinization including fully gelatinized, partially gelatinized, and pregelatinized starches. Gelatinized rice flours can include, but are not limited to, parboil, cooked, partially cooked, and extruded rice flours.

As used herein, "extruded rice" refers to rice that has been passed through an extruder.

As used herein "cooked rice" refers to rice that has been parboiled or otherwise cooked or partially cooked before or after grinding into flour.

As used herein "parboiled rice" refers to rice that has gone through a cooking process prior to hull removal.

As used herein "uncooked rice" refers to rice that has not been cooked in any manner.

As used herein "short grain rice" refers to rice that has a short, plump, round-like kernel having a length ranging from about 1 to about 2 times the width, and having a total amylose content ranging from about 0% to about 13%.

As used herein "medium grain rice" refers to rice that has a shorter, wide kernel having a length ranging from about 2 to about 3 times the width and having an amylose content ranging from about 14% to about 19%.

As used herein "long grain rice" refers to rice that has a long, slender kernel having a length ranging from about 3.5 to about 5 times the width, and having a total amylose content ranging from about 20% to about 25%.

As used herein, the term "fabricated" refers to food products made from doughs comprising flour, meal, and/or starch, such as those derived from tubers, grains, legumes, cereals, or mixtures thereof.

As used herein, "native starch" refers to starch that has not been pre-treated or cooked in any way, and includes but is not limited to hybrid starches.

As used herein "cohesive dough" is dough capable of being placed on a smooth surface and rolled or extruded to the desired final thickness or extruded through a die orifice without tearing or forming holes.

As used herein, "dehydrated potato products" includes, but is not limited to, potato flakes, potato flanules, potato granules, potato agglomerates, any other dehydrated potato material, and mixtures thereof.

As used herein, intact sheets of flakes and sheet sections are included in the term "potato flakes."

As used herein "flanules" refers to those dehydrated potato products described in U.S. Pat. No. 6,287,622, issued Sep. 11, 2001, to Villagran et al.

As used herein, "sheetable dough" is dough capable of being placed on a smooth surface and rolled to the desired final thickness without tearing or forming holes. Sheetable dough can also include dough that is capable of being formed into a sheet through an extrusion process.

As used herein, "starch" refers to a native or an unmodified carbohydrate polymer having repeating anhydroglucose units derived from materials such as, but not limited to, wheat, corn, tapioca, sago, rice, potato, oat, barley, and amaranth, and to modified starches including but not limited to hydrolyzed starches such as maltodextrins, high amylose corn maize, high amylopectin corn maize, pure amylose, chemically substituted starches, crosslinked starches, and mixtures thereof.

As used herein, "starch-based flour" refers to high polymeric carbohydrates composed of glucopyranose units, in either natural, dehydrated (e.g., flakes, granules, meal) or flour form. Starch-based flour can include, but is not limited to, potato flour, potato granules, potato flanules, potato flakes, corn flour, masa corn flour, corn grits, corn meal, rice flour, buckwheat flour, oat flour, bean flour, barley flour, tapioca, and mixtures thereof. For example, the starch-based flour can be derived from tubers, legumes, grain, or mixtures thereof.

As used herein, "modified starch" refers to starch that has been physically or chemically altered to improve its functional characteristics. Suitable modified starches include, but are not limited to, pregelatinized starches, low viscosity starches (e.g., dextrins, acid-modified starches, oxidized starches, enzyme modified starches), stabilized starches (e.g., starch esters, starch ethers), cross-linked starches, starch sugars (e.g. glucose syrup, dextrose, isoglucose) and starches that have received a combination of treatments (e.g., cross-linking and gelatinization) and mixtures thereof. When calculating the level of modified starch according to the present invention, modified starch (e.g., gelatinized starch) that is inherent in other dough ingredients such as rice flour and the dehydrated potato products is not included; only the level of modified starch added over and above that contained in other dough ingredients is included in the term "modified starch."

As used herein the term "added water" refers to water that has been added to the dry dough ingredients. Water that is inherently present in the dry dough ingredients, such as in the case of the sources of flours and starches, is not included in the "added water."

As used herein the term "emulsifier" refers to emulsifier that has been added to the dough ingredients. Emulsifiers that are inherently present in the dough ingredients, such as in the case of the potato flakes (where emulsifier is used as a processing aid during manufacturing), are not included in the term "emulsifier."

As used herein "rapid viscosity unit" (RVU) is an arbitrary unit of viscosity measurement roughly corresponding to centipoise, as measured using the RVA analytical method herein. (12 RVU equal approximately 1 centiPoise)

The terms "fat" and "oil" are used interchangeably herein unless otherwise specified. The terms "fat" or "oil" refer to edible fatty substances in a general sense, including natural or synthetic fats and oils consisting essentially of triglycerides, such as, for example soybean oil, corn oil, cottonseed oil, sunflower oil, palm oil, coconut oil, canola oil, fish oil, lard and tallow, which may have been partially or completely hydrogenated or modified otherwise, as well as non-toxic fatty materials having properties similar to triglycerides, herein referred to as non-digestible fats, which materials may be partially or fully indigestible. Reduced calorie fats and edible non-digestible fats, oils or fat substitutes are also included in the term.

The term "non-digestible fat" refers to those edible fatty materials that are partially or totally indigestible, e.g., polyol fatty acid polyesters, such as OLEAN™. The preferred non-digestible fats are fatty materials having properties similar to triglycerides, such as sucrose polyesters. These preferred non-digestible fats are described in U.S. Pat. No. 5,085,884, issued Feb. 4, 1992 to Young et al. and U.S. Pat. No. 5,422, 131, issued Jun. 6, 1995 to Elsen et al. An especially preferred brand of non-digestible fats is sold under the tradename OLEAN™.

By the term "dry blend" it is meant herein the dry raw material mixed together prior to processing of the materials so mixed.

All percentages are by weight unless otherwise specified.

All documents cited herein are, in relevant part, incorporated by reference; the citation of any document is not to be construed as an admission that it is prior art with respect to the present invention.

B. Rice Flour Compositions

Long grain, medium grain, short grain and sweet or waxy grain rice can all be made into rice flour. In addition, rice flour can be made from broken pieces or whole pieces of rice. Rice flours made from these different types of rice vary in water absorption index, peak viscosity, final viscosity, and total amylose content. Furthermore, if the rice is partially or fully pre-cooked, parboiled, or pre-gelatinized in any other way prior to, or after, processing into rice flour, the rice flour properties can be further modified.

The present invention provides rice flour compositions that are suitable for use in making fabricated snack products. The rice flour compositions, when used in fabricated snack doughs, result in cohesive doughs having the desired level of elasticity and finished fabricated snack products having the desired organoleptic properties.

The rice flour compositions of the present invention have a Peak Viscosity ranging from about 4 RVU to about 130 RVU, and preferably ranging from about 10 RVU to about 110 RVU. In one embodiment, the rice flour compositions have a Final Viscosity ranging from about 4 RVU to about 220 RVU, preferably ranging from about 60 RVU to about 110 RVU, and more preferably from about 70 RVU to about 90 RVU. In a particular embodiment, the rice flour compositions have a Water Absorption Index (WAI) ranging from about 2.6 to about 9, and preferably from about 4 to about 7.

In one embodiment herein, the rice flour composition has a total amylose content ranging from about 16% to about 25%. In an embodiment comprising long grain rice flour, the rice flour composition has a total amylose content ranging from about 20% to about 25%. In an embodiment comprising medium grain rice flour, the composition has a total amylose content ranging from about 16% to about 19%.

The rice flour compositions herein can comprise one or more types of rice flour. For example, the rice flour composition can comprise short grain rice flour, long grain rice flour, medium grain rice flour, or combinations thereof. In a preferred embodiment, the composition comprises long grain rice flour, medium grain rice flour, or combinations thereof. Furthermore, the composition can comprise rice flour that is partially or fully gelatinized. For example, the rice flour can be gelatinized, partially gelatinized, partially pre-cooked, pre-cooked, par-boiled, extruded, or combinations thereof in order to effect the desired starch degradation in the rice flour.

Mixing together the desired quantities of various rice flours can be used to make the desired rice flour composition. This can be accomplished by any suitable means such as, but not limited to, mixing the rice grains before milling, or mixing the flours together after milling.

In a preferred embodiment, gelatinized rice flour is used. In this embodiment, the composition can comprise a blend of one or more rice flours that have been gelatinized to varying degrees. For example, the gelatinized rice flour can comprise fully cooked rice, partially cooked rice, parboiled rice, extruded, or mixtures thereof. Preferably, the fully cooked gelatinized rice flour is from about 75% to about 100% gelatinized, the partially cooked rice flour and the extruded rice flour is from about 25% to about 100% gelatinized, and the parboiled rice flour is from about 75% to about 100% gelatinized.

Extrusion is the preferred method of processing the gelatinized rice flour for this invention. Extrusion provides the cooking conditions required for the starch of the rice flour to completely cook, resulting in complete gelatinization and high levels of dextrinization of the starch—i.e., starch degradation. The use of extrusion to prepare the rice flours for this invention guarantees the absence of a raw starch taste or the powdery starchy aftertaste and the excessive expansion in the finished product.

In one embodiment, the gelatinized rice flour is selected from the group consisting of partially precooked long grain rice flour, fully cooked long grain rice flour, fully cooked medium grain rice flour, parboiled rice flour, and mixtures thereof. In another embodiment, the gelatinized rice flour is made from gelatinized broken, long grain rice pieces.

Optionally, emulsifier can be added to the gelatinized rice flour as a processing aide to complex the free amylose generated during cooking and/or milling. For example, monoglycerides can be added at a level ranging from about 0.2 to about 0.7%, and preferably from about 0.3% to about 0.5% (on a dry solids basis).

The rice flour can be ground to a wide range of particle size distribution. In a particular embodiment, the composition has a particle size distribution such that about 35% of the flour remains on a US #100 mesh.

The rice flour compositions can be used to make a dry blend used in the manufacture of food products, such as fabricated snacks. In one embodiment, the dry blend comprises from about 2% to about 100%, preferably from about 3% to about 33%, and more preferably from about 4% to about 17%, rice flour composition.

The composition can also be used to produce food products such as extruded products, sauces, and coatings for fried foods, dog foods, dog biscuits, baby foods, and breads.

C. Fabricated Snack Product Preparation

Although the use of the rice flour compositions will be described primarily in terms of a preferred fabricated snack product, it should be readily apparent to one skilled in the art that the rice flour compositions of the present invention can be used in the production of any suitable food products. For instance, the rice flour compositions can be used to produce food products such as extruded products, breads, sauces, coatings for fried foods, baby foods, dog foods, dog biscuits and any other suitable food product.

The production of the preferred fabricated snack product is set forth in detail below.

1. Dough Formulation

The preferred doughs of the present invention comprise a dry blend and added water. Preferably, the doughs comprise from about 50% to about 80% dry blend and from about 20% to about 50% added water. The doughs can further comprise optional ingredients.

a. Dry Blend

Preferred doughs comprise from about 50% to about 80% dry blend, preferably from about 60% to about 75% dry blend.

The dry blend comprises the rice flour composition. Preferred dry blends comprise from about 2% to about 100%, preferably from about 3% to about 33%, and more preferably from about 4% to about 17% rice flour compositions with the balance being other ingredients, such as other starch-based flour. Suitable sources of other starch-based flour include tapioca flour, oat flour, wheat flour, rye flour, non-masa corn flour, peanut flour, and dehydrated potato products (e.g., dehydrated potato flakes, potato granules, potato flanules, mashed potato materials, and dried potato products). The flours can be blended to make snacks of different compositions, textures, and flavors.

In one embodiment, a preferred dry blend has a WAI ranging from about 3 to about 10, preferably from about 4.5 to about 9, and more preferably from about 5.5 to about 8.5. In one embodiment it is preferred that the dry blend has a Peak Viscosity ranging from about 60 RVU to about 115 RVU, preferably from about 65 RVU to about 100 RVU and more preferably from about 70 RVU to about 90 RVU. In another embodiment herein the preferred dry blend has a Final Viscosity ranging from about 75 RVU to about 120 RVU, preferably from about 80 RVU to about 115 RVU, and more preferably from about 85 RVU to about 100 RVU.

b. Added Water

Preferred dough compositions of the present invention comprise from about 20% to about 50% added water, preferably from about 25% to about 40% added water. If optional ingredients, such as maltodextrin or corn syrup solids, are added as a solution or syrup, the water in the syrup or solution is included as added water. The amount of added water also includes any water used to dissolve or disperse ingredients.

c. Optional Ingredients

Any suitable optional ingredient may be added to the doughs of the present invention. Such optional ingredients can include, but are not limited to, modified starch, gum, reducing sugar, emulsifier, and mixtures thereof. Optional ingredients are preferably included at a level ranging from about 0% to about 15% in the dough. Examples of suitable modified starches and gums can be found in U.S. Pat. No. 6,558,730, issued May 6, 2003, to Gizaw et al.

Optionally, reducing sugar can be added to the dough. While the reducing sugar content can be dependent upon that of the potatoes that were employed to prepare the dehydrated potato product, the amount of reducing sugar in the fabricated snack products can be controlled by adding suitable amounts of a reducing sugar such as maltose, lactose, dextrose, or mixtures thereof to the dough.

An ingredient that can optionally be added to the dough to aid in its processability is emulsifier. An emulsifier is preferably added to the dough composition prior to sheeting the dough. The emulsifier can be dissolved in a fat or in a polyol fatty acid polyester such as Olean™. Suitable emulsifiers include lecithin, mono- and diglycerides, diacetyl tartaric acid esters and propylene glycol mono- and diesters and polyglcerol esters. Polyglycerol emulsifiers such as monoesters of hexapolyglycerols, can be used. Particularly preferred monoglycerides are sold under the trade names of Dimodan available form Danisco®, New Century, Kans. and DMG 70, available from Archer Daniels Midlands Company, Decatur, Ill.

When calculating the level of optional ingredients according to the present invention, that level of optional ingredient which may be inherent in the rice flour and dehydrated potato products is not included. For example, modified starch (e.g. gelatinized starch) that is inherent in the rice flour and in dehydrated potato products is not included. (The level of modified starch is that which is added over and above that level inherently present in the rice flour and the dehydrated potato products.)

2. Dough Preparation

The doughs of the present invention can be prepared by any suitable method for forming sheetable doughs. Typically, a loose, dry dough is prepared by thoroughly mixing together the ingredients using conventional mixers. Preferably, a pre-blend of the wet ingredients and a pre-blend of the dry ingredients are prepared; the wet pre-blend and the dry pre-blend are then mixed together to form the dough. Hobart® mixers are preferred for batch operations and Turbulizer® mixers are preferred for continuous mixing operations. Alternatively, extruders can be used to mix the dough and to form sheets or shaped pieces.

a. Sheeting

Once prepared, the dough is then formed into a relatively flat, thin sheet. Any method suitable for forming such sheets from starch-based doughs can be used. For example, the sheet can be rolled out between two counter rotating cylindrical rollers to obtain a uniform, relatively thin sheet of dough material. Any conventional sheeting, milling and gauging equipment can be used. The mill rolls should preferably be heated to from about 90° F. (32° C.) to about 135° F. (57° C). In a preferred embodiment, the mill rolls are kept at two different temperatures, with the front roller being hotter than the back roller. The dough can also be formed into a sheet by extrusion.

Doughs of the present invention are usually formed into a sheet having a thickness ranging from about 0.015 to about 0.10 inches (from about 0.038 to about 0.25 cm), and preferably to a thickness ranging from about 0.05 to about 0.10 inches (from about 0.013 to about 0.25 cm), and most preferably from about 0.065 inches to about 0.080 inches (0.165 to 0.203 cm).

The dough sheet is then formed into snack pieces of a predetermined size and shape. The snack pieces can be formed using any suitable stamping or cutting equipment. The snack pieces can be formed into a variety of shapes. For example, the snack pieces can be in the shape of ovals, squares, circles, a bowtie, a star wheel, or a pin wheel. The pieces can be scored to make rippled chips as described by Dawes et al. in PCT Application No. PCT/US95/07610, published Jan. 25, 1996 as WO 96/01572.

b. Frying

After the snack pieces are formed, they are cooked until crisp to form fabricated snack products. The snack pieces can be fried in a fat composition comprising digestible fat, non-digestible fat, or mixtures thereof. For best results, clean frying oil should be used. The free fatty acid content of the oil should preferably be maintained at less than about 1%, more preferably less than about 0.3%, in order to reduce the oil oxidation rate.

In a preferred embodiment of the present invention, the frying oil has less than about 25% saturated fat, preferably less than about 20%. This type of oil improves the lubricity of the finished fabricated snack products such that the finished fabricated snack products have an enhanced flavor display. The flavor profile of these oils also enhance the flavor profile of topically seasoned products because of the oils' lower melting point. Examples of such oils include sunflower oil containing medium to high levels of oleic acid.

In another embodiment of the present invention, the snack pieces are fried in a blend of non-digestible fat and digestible fat. Preferably, the blend comprises from about 20% to about 90% non-digestible fat and from about 10% to about 80% digestible fat, more preferably from about 50% to about 90% non-digestible fat and from about 10% to about 50% digestible fat, and still more preferably from about 70% to about 85% non-digestible fat and from about 15% to about 30% digestible fat. Other ingredients known in the art can also be added to the edible fats and oils, including antioxidants such as TBHQ, tocopherols, ascorbic acid, chelating agents such as citric acid, and anti-foaming agents such as dimethylpolysiloxane.

It is preferred to fry the snack pieces at temperatures of from about 275° F. (135° C.) to about 420° F. (215° C.), preferably from about 300° F. (149° C.) to about 410° F. (210° C.), and more preferably from about 350° F. (177° C.) to about 400° F. (204° C.) for a time sufficient to form a product having about 6% or less moisture, preferably from about 0.5% to about 4%, and more preferably from about 1% to about 2.5% moisture. The exact frying time is controlled by the temperature of the frying fat and the starting water content of the dough, which can be easily determined by one skilled in the art.

Preferably, the snack pieces are fried in oil using a continuous frying method and are constrained during frying. This constrained frying method and apparatus is described in U.S. Pat. No. 3,626,466 issued Dec. 7, 1971 to Liepa. The shaped, constrained snack pieces are passed through the frying medium until they are fried to a crisp state with a final moisture content of from about 0.5% to about 4%, preferably from about 1% to about 2.5%.

Any other method of frying, such as continuous frying or batch frying of the snack pieces in a non-constrained mode, is also acceptable. For example, the snack pieces can be immersed in the frying fat on a moving belt or basket.

The fabricated snack products made from this process typically have from about 20% to about 45%, and preferably from about 25% to about 40%, total fat (i.e., combined non-digestible and digestible fat). If a higher fat level is desired to further improve the flavor or lubricity of the fabricated snack products, an oil, such as a triglyceride oil, can be sprayed or applied by any other suitable means onto the fabricated snack products when they emerge from the fryer, or when they are removed from the mold used in constrained frying. Preferably, the triglyceride oils applied have an iodine value greater than about 75, and most preferably above about 90. The additionally applied oil can be used to increase the total fat content of the fabricated snack products to as high as 45% total fat. Thus, fabricated snack products having various fat contents can be made using this additional step. In a preferred embodiment, at least 10%, preferably at least about 20%, of the total fat in the finished fabricated snack products is topical surface fat.

Oils with characteristic flavor or highly unsaturated oils can be sprayed, tumbled or otherwise applied onto the fabricated snack products after frying. Preferably triglyceride oils and non-digestible fats are used as a carrier to disperse flavors and are added topically to the fabricated snack products. These include, but are not limited to, butter flavored oils, natural or artificial flavored oils, herb oils, and oils with potato, garlic, or onion flavors added. This allows the introduction of a variety of flavors without having the flavor undergo browning reactions during the frying. This method can be used to introduce oils which would ordinarily undergo polymerization or oxidation during the heating necessary to fry the snacks.

The finished products from this invention have a lighter and crispier texture than typical potato snacks due to the rice flour added into the formula. The rice flour is responsible for creating a light texture with a controlled expansion, which means a chip surface without the presence of external bubbles and only with small and internal bubbles. These internal bubbles increase the ability for the chip to absorb more water than typical potato crisps, which allows to indirectly determine the eating quality of the chip. The WAI of the finished chip of this invention ranges from 4 to 7.5 g of water/g of sample.

D. Analytical Methods

1. Water Absorption Index (WAI)

a. Dry Ingredients and Flour Blend:

In general, the terms "Water Absorption Index" and "WAI" refer to the measurement of the water-holding capacity of a carbohydrate based material as a result of a cooking process. (See e.g. R. A. Anderson et al., *Gelatinization of Corn Grits By Roll- and Extrusion-Cooking,* 14(1):4 CEREAL SCIENCE TODAY (1969).)

The WAI for a sample is determined by the following procedure:

(1) The weight to two decimal places of an empty centrifuge tube is determined.
(2) Two grams of dry sample are placed into the tube. If a finished product (i.e. a food product such as a snack chip) is being tested, the particle size is first reduced by grinding the product in a coffee grinder until the pieces sift through a US # 40 sieve. The ground sample (2 g) is then added to the tube.
(3) Thirty milliliters of water are added to the tube.
(4) The water and sample are stirred vigorously to insure no dry lumps remain.
(5) The tube is placed in a 86° F. (30° C.) water bath for 30 minutes, repeating the stirring procedure at 10 and 20 minutes.
(6) The tube is then centrifuged for 15 minutes at 3,000 rpm.
(7) The water is then decanted from the tube, leaving a gel behind.
(8) The tube and contents are weighed.
(9) The WAI is calculated by dividing the weight of the resulting gel by the weight of the dry sample:

$$WAI = ([\text{weight of tube and gel}] - [\text{weight of tube}]) \div [\text{weight of dry sample}])$$

b. Finished Snack Product

The oil is removed from the product using a Carver Lab Press (Model #C). The fried product is placed into a cylinder. The cylinder is put into the press and the hand lever is pressed until the pressure reaches 15,000 lbs per sq. inch ($1.03 \times 10^8$ Pa) after the oil is removed from the product. The product is removed from the cylinder. Steps (1)-(9) above for measuring the WAI of Dry Ingredients and Flour Blend are then followed.

2. Rheological Properties Using the Rapid Visco Analyzer (RVA)

The rheological properties of the dry ingredients, flour blends, and finished products are measured using the Rapid Visco Analyzer (RVA) model RVA-4. The RVA was originally developed to rapidly measure $\alpha$-amylase activity in sprouted wheat. This viscometer characterizes the starch quality during heating and cooling while stirring the starch sample. The Rapid Visco Analyzer (RVA) is used to directly measure the viscous properties of the starches, and flours. The tool requires about 2 to 4 g of sample and about 25 grams of water.

For best results, sample weights and the water added should be corrected for the sample moisture content, to give a constant dry weight. The moisture basis normally used is 14% as is, and correction tables are available from Newport Scientific. The correction formulae for 14% moisture basis are:

$$M2 = (100-14) \times M1/(100-W1)$$

$$W2 = 25.0 + (M1 - M2)$$

where
M1=sample mass and is about 3.0 g
M2=corrected sample mass
W1=actual moisture content of the sample (% as is)

The water and sample mixture is measured while going through a pre-defined profile of mixing, measuring, heating and cooling, as set-up using Standard Profile (1) of the instrument. This test provides dough viscosity information that translates into flour quality.

The key parameters used to characterize the present invention are pasting temperature, peak viscosity, peak viscosity time and final viscosity.

RVA Method

Dry Ingredients and Flour Blend:
(1) Determine moisture (M) of sample from air oven.
(2) Calculate sample weight (S) and water weight (W).
(3) Place sample and water into canister.
(4) Place canister into RVA tower and run the Standard Profile (1).

3. % Amylose

Percent amylose is measured in accordance with the analytical method set forth in U.S. Pat. No. 6,066,353.

E. EXAMPLES

Particular embodiments of the present invention are illustrated by the following non-limiting examples.

Examples 1, 2, 3, 4

The following examples illustrate physical properties of rice flour compositions of the present invention.

Physical Properties of Rice Flour Compositions

| Rice flour composition | Example 1 | Example 2 | Example 3 | Example 4 |
|---|---|---|---|---|
| WAI | 3 | 3.7 | 6.0 | 5.5 |
| Peak Viscosity (RVU) | 70 | 33 | 50 | 60 |
| Final Viscosity (RVU) | 110 | 55 | 70 | 75 |
| Rice flour composition | 60% partially precooked rice flour (RF-GL1080, Sage V, Houston, TX), and 40% uncooked rice flour (RF-L0080, Sage V, Houston, TX) | 60% parboiled rice flour (RF-P0080, Sage V, Houston, TX), and 40% partially precooked rice flour (RF-GL1080, Sage V, Houston, TX) | 65% extruded rice flour (Sage V, Houston, TX), and 35% precooked rice flour (RF-GL1080, Sage V, Houston, TX) | 100% Extruded rice flour (Sage V, Houston, TX), |

Examples 5-6

Dough compositions are prepared from the dry blends set forth in the table below. The dough compositions comprise 65% dry blend and 35% added water. The maltodextrin is first dissolved in the added water, then all ingredients are blended in a Turbulizer® mixer to form a loose, dry dough.

The dough is sheeted by continuously feeding it through a pair of sheeting rolls forming an elastic continuous sheet without pin holes. Sheet thickness is controlled to about 0.02 inches (0.05 cm). The back roll is heated to about 90° F. (32° C.) and the front roll is heated to about 135° F. (57° C.).

The dough sheet is then cut into oval shaped pieces and fried in a constrained frying mold at about 400° F. (204° C.) for about 8 seconds. The frying oil is a 50/50 blend of cottonseed and corn oils. The fried pieces contain about 38% fat.

These products have a crisp texture, fast mouth-melt and clean flavor.

| | Example 5 | Example 6 |
|---|---|---|
| Ingredients (% dry blend) | | |
| Potato Flakes | 62 | 62 |
| RF-L0080 (uncooked long-grain rice flour, available from Sage V, Houston, TX) | 0 | 0 |
| RF-GL1080 (partially cooked, long-grain rice flour, available from Sage V, Houston, TX) | 20 | 15 |
| RF-P0080 (long-grain, parboiled rice flour, available from Sage V, Houston, TX) | 0 | 5 |
| Maltodextrin | 6 | 6 |
| Wheat Starch | 12 | 12 |
| Characteristics of the dry blend | | |
| WAI (g water/g sample) | 6.7 | 6.6 |
| Peak Viscosity RVU | 95 | 70 |
| Final Viscosity RVU | 110 | 85 |

INCORPORATION BY REFERENCE

All documents cited in the Detailed Description of the Invention are, in relevant part, incorporated herein by reference; the citation of any document is not to be construed as an admission that it is prior art with respect to the present invention.

What is claimed:

1. A dough composition for making a fabricated snack product, comprising:
   (I) from about 60% to about 75%, by weight, of a dry blend, comprising:
      (a) from about 2% to about 100%, by weight, rice flour composition that has been extruded, parboiled and combinations thereof, wherein the rice flour composition comprises long grain rice flour, medium grain rice flour, or combinations thereof, such that the resulting rice flour composition is from about 75% to about 100% gelatinized and has a WAI of from about 2.6 to about 9 g of water/g, a Peak Viscosity from 10 RVU to 110 RVU, and a Final Viscosity from 60 RVU to 110 RVU;
      (b) from about 0% to about 98%, by weight, starch-based flours selected from the group consisting of tapioca flour, oat flour, wheat flour, rye flour, non-masa corn flour, and mixtures thereof;
      (c) potato flakes;
   wherein the dry blend has a WAI ranging between about 5.5 and about 8.5, a Peak Viscosity ranging between about 60 RVU and about 115 RVU, and a Final Viscosity ranging between about 75 RVU and 120 RVU;
   (II) from about 25% to about 40%, by weight, of added water;
   (III) from about 0% to about 15%, by weight, optional ingredients.

2. A chip containing the dough composition of claim 1 having a WAI ranging from about 4 to about 7.5 g of water/g.

3. The dough composition of claim 1, wherein said rice flour composition has a total amylose content ranging from about 16% to about 25%.

* * * * *